Sept. 6, 1927.                                                            1,641,202
                                    S. RUPPEL
                      INTERRUPTER FOR ELECTRIC CIRCUITS
                           Filed May 1, 1926              2 Sheets-Sheet 1
Fig. 1.            Fig. 2.            Fig. 3.
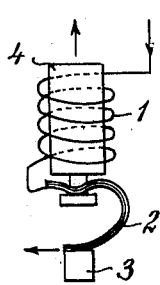  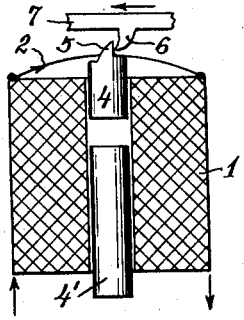  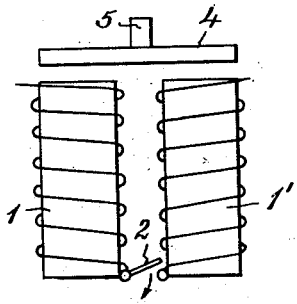
Fig. 4.            Fig. 5.            Fig. 6.
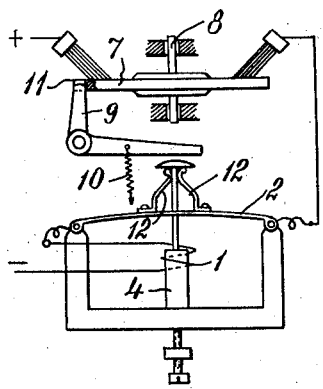  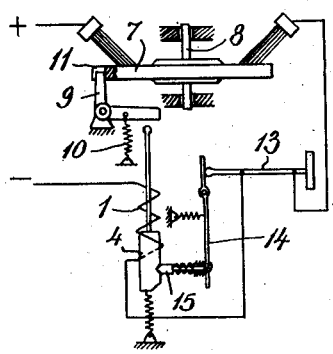  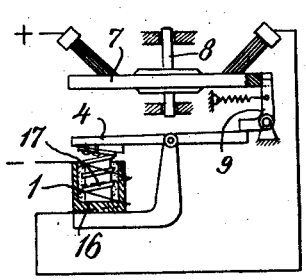
Fig. 7.            Fig. 8.            Fig. 9.
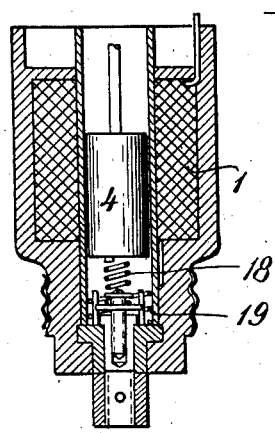  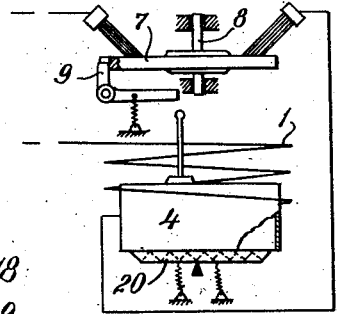  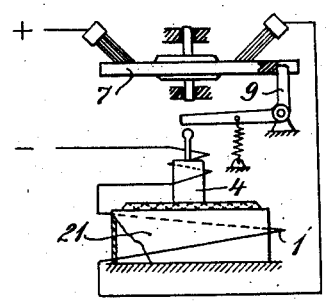
INVENTOR
Sigwart Ruppel
BY
Pennie, Davis, Marvin & Edmonds
HIS ATTORNEYS Sept. 6, 1927.
S. RUPPEL
1,641,202
INTERRUPTER FOR ELECTRIC CIRCUITS
Filed May 1, 1926
2 Sheets-Sheet 2
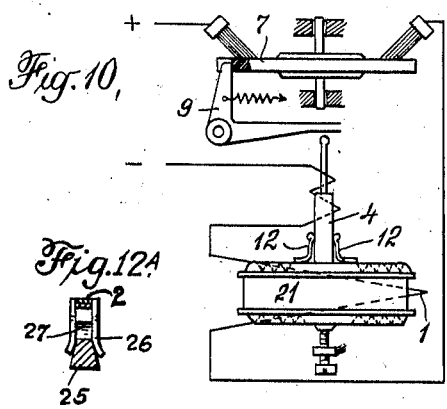
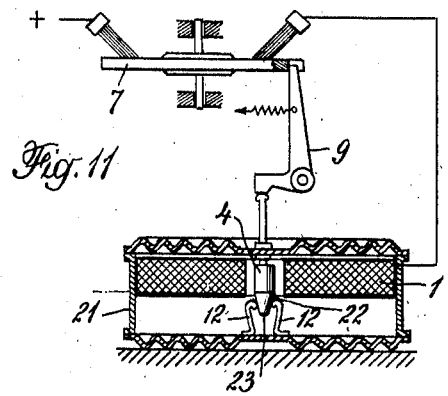
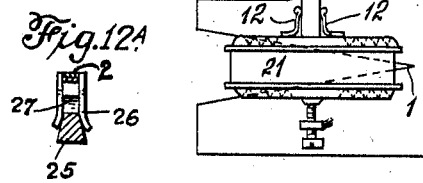
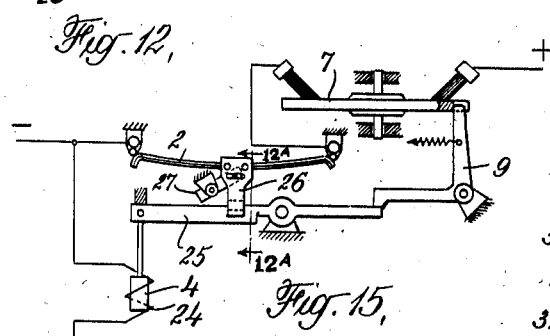
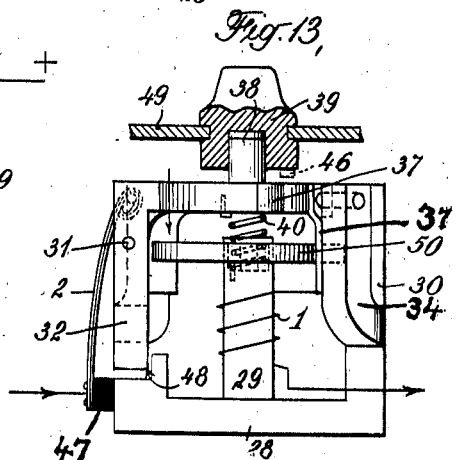
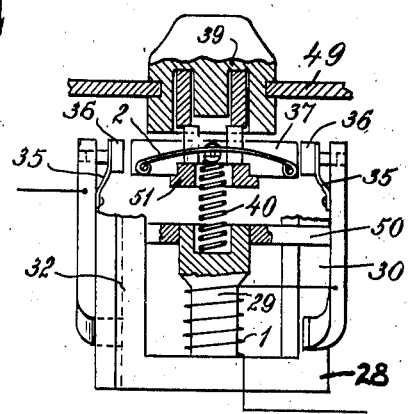
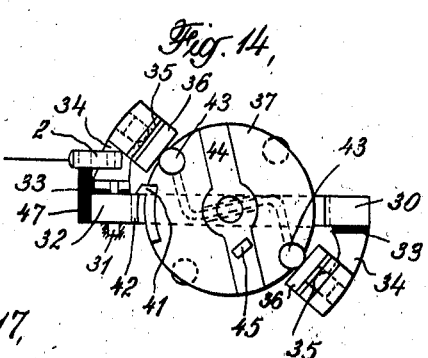
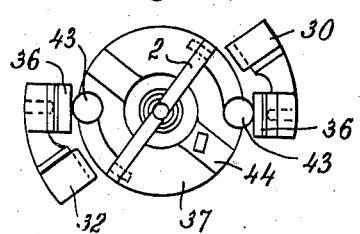
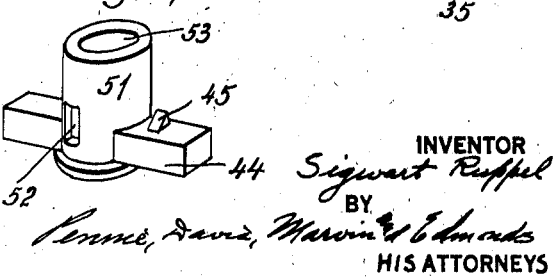
INVENTOR
Sigwart Ruppel
BY
HIS ATTORNEYS Patented Sept. 6, 1927.

1,641,202

UNITED STATES PATENT OFFICE.

SIGWART RUPPEL, OF FRANKFORT-ON-THE-MAIN, GERMANY.

INTERRUPTER FOR ELECTRIC CIRCUITS.

Application filed May 1, 1926, Serial No. 105,915, and in Germany January 24, 1924.

This invention relates to interrupters for electric circuits and particularly to interrupters or circuit-breakers which are actuated by the cooperative action of an electromagnetically responsive device and a thermally responsive device to effect the opening of the circuit. The object of the present invention is to improve the construction of such circuit-interrupters.

Overload circuit-interrupters with a purely electro-magnetic release, for the protection of electric lines and apparatus, come into action under certain circumstances even in case of temporary overloads, although the apparatus protected by the circuit-breaker, or the line, could very well stand an overload of brief duration. Thermal release devices, on the other hand, which are dependent not only upon the magnitude of the current that is present but also upon the duration of the overload, have as a rule far too slow an action in case of very great overloads that occur suddenly, as for example in case of a short-circuit, so that the dangers connected with a short-circuit or the like are not abolished in the case of purely thermal circuit-breakers.

For this reason combined circuit-interrupters have already been constructed, which have both an electro-magnetic and a thermal release. If, as has hitherto always been the case, each of the two releasing devices is constructed by itself with regard to the highest admissible amperage, then a waste of material results and an unnecessary increase in cost of the circuit-breaker, since in these automatic circuit-breakers the cooperation of the thermal releasing device is unnecessary in a releasing action that is produced by electro-magnetic means, and vice versa the cooperation of the magnet coil is unnecessary in a thermal releasing action. Furthermore, if the two releasing devices are constructed independently of one another, there result difficulties in the housing, particularly in the case of interrupters for protecting domestic lighting circuits which are adapted to be received within standard fuse receptacles, since the available space is limited.

Electric circuits such as those of transmission lines, domestic lighting systems, dynamo-electric machines and translation devices are subject to damage from two sorts of overload currents. The first is the overload of relatively high current value such as that caused by short circuit, and which must be removed substantially instantaneously to prevent damage to the circuit. The second is the overload of relatively low current value which can endure for considerable periods of time without in any way injuring the circuit, but which, if sustained for too long a time will cause a dangerous rise in temperature of the circuit. Depending upon such factors as the size of the conductors, the protection from heat radiation by the electric insulation, etc., every circuit will withstand a predetermined current load continuously. The capacity of a safety fuse is ordinarily chosen so that the fuse will blow at a current value which is in the neighborhood of this continuous current rating of the circuit and this maximum current load which a circuit will withstand continuously is referred to herein as the "limit current".

According to the present invention, both the releasing devices are constructed in such a way that up to a load of the amplitude of the limit current, neither of the two releases suffices by itself to cause the circuit-breaker to respond, but that, on the other hand, the force that is necessary for the opening of the circuit-breaker is produced only by the cooperation of the two releasing devices. Solely in the construction of the electro-magnet coil care should be taken that its power shall suffice by itself to release the circuit-breaker in case of the occurrence of sudden great overloads, for example a short-circuit, while in case of long-continued but in themselves trifling overloads the thermal releasing force must be reinforced by the magnet, excited to a certain degree. Both the releasing devices may, in this mode of mutual supplementing, be made weaker than in the case of the circuit-breakers hitherto known, and can therefore be housed better and more safely in the interiors of the plugs.

The present invention provides an electro-magnetically responsive device for effecting the operation of the circuit-interrupter to open the circuit at a predetermined current which is the maximum instantaneous current which the circuit will withstand. The thermally actuated device is arranged to influence the operation of the electro-magnetically responsive device so as to effect the operation of the interrupter to open the circuit at currents less than the predetermined current just mentioned, provided such lower currents are continued for a sufficient length of time to dangerously increase the temperature of the circuit. Through the combined effects of the two devices the circuit-interrupter is operated either at the maximum instantaneous current or at some continued current of lesser value but greater than the continuous rating of the circuit. In this way the circuit is perfectly protected against overloads of every kind.

The invention will be better understood by referring to the accompanying drawings which illustrate by way of example a number of embodiments of the invention. Referring to these drawings, Fig. 1 is a diagrammatic representation of the 2 coacting releasing devices;

Fig. 2 is a longitudinal section through the energizing coil of one practical arrangement of the releasing devices, the switch member being shown diagrammatically;

Fig. 3 is a diagram of an electro-magnetic releasing device made in two sections, the circuit to the second section being closed by the thermally actuated device;

Figs. 4 to 6 inclusive are diagrammatic views of three different arrangements of the apparatus in connection with a rotary switch member;

Fig. 7 is a longitudinal section through a practical form of the apparatus constructed to be received within a screw receptacle;

Figs. 8 to 11 inclusive are diagrammatic views somewhat similar to Figs. 4 to 6 in which a modified form of thermally actuated device is shown;

Fig. 12 is a diagrammatic view of an adaptation of the circuit-interrupter arranged to open with drop in voltage as well as increase in current;

Fig. 12^A is a section taken along line 12^A—12^A of Fig. 12;

Figs. 13 and 14 are respectively a side elevation and a plan view of a circuit-interrupter involving the invention and in which the opening of the interrupter is independent of the manipulation of the operating handle; and Figs. 15 to 17 inclusive are views of a similar circuit-interrupter of modified construction.

By referring first to Figs. 1 to 3 the principle of the invention will be understood. In the form of construction in Fig. 1 the current traverses, in the direction of the arrow, first the magnet coil 1 and then the bimetallic spring 2 which is fastened to a part 3 of the apparatus casing or the like. The bimetallic spring that acts as a thermal release consists of two closely superimposed thin metal laminæ of different material with co-efficients of expansion of different magnitude. In case of a short-circuit or the like the magnet armature 4 is drawn upward by the coil 1 and acts in any desired manner upon a latch device which has hitherto held the interrupter in the closed position. In case of a current somewhat above the maximum load which the circuit will stand continuously, the magnet is excited only to a slight extent, but if this overload is continued there occurs a heating of the bimetallic spring 2; the latter bends upward and lifts the armature 4, which is influenced also by the magnetic force, to effect the release of the latch device.

In the form of construction in accordance with Fig. 2, there are provided, inside of the magnet coil 1, a stationary core 4' and a movable armature 4; the latter is attached to the bimetallic spring 2, which is included in the circuit. The armature has a nose 5 which engages a projection 6 on the switch member or bridge 7. The switch bridge endeavors, under the action of the switching-off spring (not shown in the drawing), to turn in the direction of the arrow and thereby to separate the contacts from one another. In this case, too, when a short-circuit occurs, the magnetic force solely by itself draws the armature 4 into the coil, and there results a release of the switch bridge 7. In case of a continued load greater than the predetermined continuous current rating of the circuit the bimetallic spring bends downward and thereby, in conjunction with the magnetic force, brings the armature 4 into the switching-off position.

The automatic circuit-breaker in accordance with Fig. 3 has two magnet cores 1 and 1', only one of which, to begin with (in the position shown in the drawing), acts upon the magnet armature 4 and suffices by itself to release the circuit-breaker in case of a very considerable excess of current. In case of continued overloads, on the other hand, a switch constituted by the thermo-spring 2 closes and brings the second magnet core 1' into action likewise; the total power of both the magnets is then sufficient to effect the release by a current only slightly above the continuous rating of the circuit. The bimetallic spring 2 need not, as in the case of the example in accordance with Figs. 1–2, be traversed by the current and therefore directly heated; there may also be employed, as in the form of construction in accordance with Fig. 3, an indirect heating by means of the current heat that prevails in the casing of the apparatus.

In Figs. 4 to 17 various forms of construction are represented as examples. In Fig. 4 the switch bridge 7 is supported so as to be rotatable about the axis 8. In the switched-on position that is shown in the drawing it is held fast, counter to the action of the switching-off spring (not shown in the drawing), by means of the latch lever 9 which engages notch 11 in the switch bridge in consequence of the action of spring 10. The current traverses the switch bridge 7, and thereupon the bimetallic spring 2, which acts as a thermostat, and then the magnet winding 1 that surrounds the armature 4. The bimetallic spring carries two yieldable arms 12 which, as long as the bimetallic spring 2 is cold, frictionally engage the shaft of the armature 4 and impede the upward movement thereof.

In case of a short-circuit this hindrance is overcome by the magnetic force of coil 1, the latch lever being turned in the counter-clockwise direction, the notch 11 released, and the switching-off spring thereby brought into action. In case of continued heating by a lesser load at which the magnet coil alone does not suffice, the spring 2 bends upward, accordingly lessens the impeding action, and upon further bending, if the arms 12 are suitably shaped, as represented, aids coil 2 in releasing the armature 4.

The construction in accordance with Fig. 5 is distinguished from the preceding one in that there is used, in place of a bimetallic spring, a heating wire 13 which, by means of the change in its length that occurs upon heating, turns the lever 14, which is subject to spring action, and in so doing draws back the bolt 15 from a recess in the armature 4. Up to a load of the amplitude of the limit current the circuit-breaker cannot respond, since every movement of the armature is prevented. In case of long-continued overloads, the bolt 15 is drawn back and the armature 4 thereby set free for a release movement. Since the bolt 15 has sloped-off surfaces, the armature 4 can, in case of a short-circuit or the like, be attracted by the then powerfully excited magnet coil, the hindrance being overcome.

In the form of construction as shown in Fig. 6, the armature 4, which is constituted as a rotatable lever, is under the influence of a pot-shaped magnet 16 that is filled with a melting-composition. The current coil 1 serves not only for the excitation of the magnet but also for the heating of the melting-composition. In the latter there is arranged a spring 17 which endeavors to press the armature 4 away from the magnet. In case of a limit current, the magnetic force can draw the armature down in opposition to spring 17 when the current is continued long enough to melt the composition.

Fig. 7 shows an automatic circuit-breaker in plug form, in which the armature-withdrawal spring 18 is itself constituted as a thermostat. In the cold state the spring 18 holds back the armature 4 as in Figs. 1 and 2. The heating in this case also is effected indirectly. For this purpose there is provided a current-winding 19 which is connected in series with the magnet coil 1. When heated, the spring 18 expands and thereby alters the releasing force; in case of a short circuit the force of the magnet alone overcomes the armature-withdrawal spring 18.

A further form of construction of the thermostat is represented in Figs. 8 to 11. The thermal release in these constructions consists of a sheet iron vessel which is closed air-tight and which has diaphragms that expand upon heating. In the form shown in Fig. 8 the armature 4 itself is constituted as a sheet iron vessel which is subjected to the action of the current-winding 1. Upon heating, the air in the vessel expands and the diaphragm 20 bulges outwardly in such a way that the armature is lifted. The latter thereby is moved into a more powerful magnetic field and is drawn completely into the magnet coil even in case of slight but continued overloads. In the form of construction in accordance with Fig. 9 the armature 4 and the vessel 21 are constructed separately. The mode of operation is, however, the same.

The automatic circuit-breaker illustrated in Fig. 10, like the form of construction in accordance with Fig. 9, has the armature 4 and vessel 21 separate. Upon these, somewhat as in the construction shown in Fig. 4, there are provided yieldable arms 12 which, when the thermostat is cold, impede the releasing movement of the armature 4.

In Fig. 11, too, there is provided an armature 4 that is separate from the vessel 21, but in this construction the armature and the coil are situated in the interior of the air casing 21, the armature 4 has, in continuation of a cylindrical surface, a conical surface 22 and a further conical surface 23 with differing inclinations. In the cold state both the arms 12 act against the conical surface 22. The cone angle of this surface is smaller than the double angle of friction, so that an upward movement of the armature 4 is prevented. If the air in the interior of the case becomes heated, not only the upper but also the lower diaphragm expands, the magnet 4 is lifted with respect to the arms 12, so that the latter slide over upon the conical surface 23. The cone angle of this surface, however, is greater than the double angle of friction, so that the upward movement of the armature is now simultaneously reinforced.

Fig. 12 shows a form of construction in which the electro-magnetic and thermal force that provides the releasing force is dependent not only upon the amplitude of the current but also upon the voltage. The bimetallic spring 2, as in the preceding form of construction, is situated in the main circuit, while the armature 4 is under the influence of a voltage coil 24. With the armature 4 there is connected a special lever 25, which in turn acts upon the latch lever 9.

The bimetallic spring 2 carries the friction arms 26 which in pincer-like fashion grasp the lever 25, the cross-section of which may be shaped in the form of a wedge. A short lever 27, rotatable about a fixed point, is on the one hand supported in a bearing on the spring 26, and on the other hand rests upon the coil-side end of the lever 25.

In the normal state the armature 4 is held aloft by the coil 24 in correspondence with the constant voltage and endeavors to turn the lever 25 out of its position in a clockwise direction. If a short-circuit occurs, i. e. if the voltage suddenly becomes zero, an immediate release takes place. In case of an overload of short duration the field of the coil 24 becomes weaker, to be sure, but the lever 25 is held fast by the spring 26. In case of a continued limit current load the bimetallic spring 2 becomes heated, the arms 26 are slowly drawn upward, and the release thereby prepared for in a two-fold respect. In consequence of the wedge-shaped cross-section of the lever 25 the pressure of the spring 26 becomes constantly less, and on the other hand the lever 27 pressed upon the coil-side end of the lever 25 and the armature 4 gets into a weaker field, so that the release ultimately ensues.

Figs. 13 to 17 represent an automatic circuit-breaker with a so-called free release which prevents the circuit-breaker from being held in the switched-on position by means of the holding fast of the handle in spite of the presence of an overload. In accordance with the invention, the release of the hand-switching is effected electro-magnetically or thermally or by the cooperation of both means.

The magnet yoke 28 has a fixed iron core 29, with a winding 1, a stationary outer arm 30, and an outer arm 32 that is rotatable in a vertical plane about a separately supported fixed pin 31. To the outer arms 30 and 32 there are fastened, with interposition of insulating pieces 33, (see Fig. 14) arms 34 made of non-magnetic electrically conducting material. To these the contact plates 36 are attached by means of electrically conducting springs 35.

The switch disk 37, of insulating material, which is not only rotatable in the horizontal plane but also axially displaceable, is guided in the switch handle 39 by means of the pin 38, in which connection a spring 40 acts simultaneously as a pressure spring and as a rotation spring. The switch disk 37 is held fast in the switched-on position shown in the drawing, counter to the action of the spring 40, by the coaction of nose 41 affixed to the switch disk with a projection 42 that is attached to the movable arm 32. The switch disk carries the contact cylinders 43 as well as an armature 44 with a pin-shaped extension 45. The latter coacts with a corresponding pin 46 on the switch-handle 39.

To the magnet yoke 28 there is attached, with interposition of the insulation 47, the bimetallic spring 2; in the cold state the latter endeavors to turn the movable outer arm 32 out of its position in a clockwise direction and accordingly acts counter to the magnetic force, which, by overcoming the air gap 48 endeavors to draw the arm up against the magnet yoke. In case of increasing heating this counteraction of the thermo-spring stops and ultimately reverses itself in such a way that in case of long-continued heating the bimetallic spring reinforces the magnetic pull. The circuit-breaker itself is protected from outside influences by a casing 49 in which the turn-knob 39 is rotatably supported. A protection disk 50 protects the coil 1 from any arcs that may possibly occur.

In case of a short-circuit the magnetic force overcomes the counteracting bimetallic spring 2 and brings about a rotary movement of the outer arm 32 in a counter-clockwise direction; at the same time there takes place an attraction of the switch disk 37 downward, in which connection the force of the pressure spring 40 has to be overcome. In case of continued heating, the electro-magnetic release and the thermo-release jointly bring about the rotatory movement of the outer arm 32 as soon as the catch 41, 42 is set free and the extension 45 has freed itself from the pin 46. The switch disk 37 is then free and snaps into the off-position (dotted lines shown in Fig. 14). The armature 44 reinforces the switching off-spring in the first part of this rotary movement of the switch disk, so that the switching-off takes place with extraordinary rapidity.

The form of construction shown in Figs. 15 to 17 is distinguished essentially only by a different arrangement of the bimetallic spring 2. The reference numerals of Figs. 13 and 14 are also applied in Figs. 15 to 17 in so far as they denote identical parts. In contrast to the preceding form of construction both the outer arms 30, 32 of the magnet yoke are stationary and the thermo-spring 2 is transferred to the switch disk 37, where it serves as the electrical connection between the contact cylinders 43. The combined pressure and rotation spring 40 is firmly connected at its upper end with the spring 2, while it has its lower end resting in an insulated recess in the magnet core 29. The armature hub 51, which is pivoted in the switch bridge 37, has a square aperture 52 (see Fig. 17) for the bimetallic spring 2 in order that the latter may pass through the armature 51 without contact. A cylindrical bore 53 serves for guidance in the handle 39 as well as for reception of the spring 40.

In the cold state the bimetallic spring is flat and has in that position a definite applied tension, so that the switch bridge 37 is pressed upward more or less powerfully.

In case of a short-circuit the magnetic releasing force overcomes the pressure of the spring 40 and draws the switch disk 37 downward; in this construction, as in Figs. 14 and 13, there occur an uncoupling and an energetic rotation in a counter-clockwise direction. The tension of the spring 40 is chosen in such a way that in case of an overload of short duration the magnetic intensity of field shall not suffice by itself to bring about the release. In case of a continued limit current load the bimetallic spring 2 becomes hot and bends upward. The tension of spring 40 is thereby diminished, and a lesser magnetic releasing force then suffices to bring about the release.

I claim:

1. An interrupter for electric circuits comprising the combination of a rotatable switch member biased to the open position, a latch for holding the switch member in the closed position, an operating handle having a lug for engaging the switch member to rotate it to the closed position, an electro-magnetically responsive device operatively associated with the latch and with the switch member to release the latch and to move the switch member axially to disengage said lug and allow the switch member to move to the open position at a predetermined current value, and a thermally actuated device co-acting with said electro-magnetically responsive device to retard the action thereof when the thermally actuated device is relatively cool and to assist the action thereof when the thermally actuated device is relatively warm.

2. An interrupter for electric circuits comprising the combination of a switch member biased to the open position, a latch for holding the switch member in the closed position, and an electro-magnetically responsive device and a thermally actuated device associated with one another to actuate the latch, each of said devices having a moving element, the moving elements of said devices being arranged to directly engage one another so that when the thermally actuated device is relatively cool the movable element of the electro-magnetically responsive device is retarded in its movement, said retarding effect becoming less as the temperature of the thermally actuated device increases, the thermally actuated device acting to assist the electro-magnetically responsive device at relatively high temperatures.

3. An interrupter for electric circuits comprising the combination of a rotatable switch member biased to the open position, a means for holding the switch member in the closed position, electro-magnetic means acting upon said holding means consisting of an armature, the movement of which causes a tripping of the holding means, and a voltage coil, a thermally responsive device associated with said electro-magnetically responsive device for modifying the action thereof upon the holding means, said thermally responsive device being actuated by excessive current passing therethrough.

4. An interrupter for electric circuits comprising the combination of a switch member held in the closed position but biased to the open position, an electromagnetically responsive device adapted to release the switch member, and a thermally actuated device adapted to be heated when current is passed through the interrupter, said thermally actuated device when in the cold state, retarding the electromagnetically responsive device, but upon becoming heated, acting to assist the electromagnetically responsive device in releasing the switch member.

In testimony whereof I affix my signature.

SIGWART RUPPEL.